United States Patent [19]

Sakurai et al.

[11] 4,306,460

[45] Dec. 22, 1981

[54] DIFFERENTIAL PRESSURE TRANSDUCER

[75] Inventors: Yutaka Sakurai, Katsuta; Takeo Nagata, Hitachi; Yoshitaka Matsuoka, Mito; Satoshi Shimada, Hitachi; Mitsuo Ai, Katsuta, all of Japan

[73] Assignee: Hitachi, Ltd., Tokyo, Japan

[21] Appl. No.: 103,407

[22] Filed: Dec. 13, 1979

[30] Foreign Application Priority Data

Dec. 22, 1978 [JP] Japan ................. 53-157400

[51] Int. Cl.³ .............................................. G01L 9/06
[52] U.S. Cl. ........................................ 73/721; 73/720
[58] Field of Search ............... 73/721, 720, 726, 727

[56] References Cited

U.S. PATENT DOCUMENTS

| | | | |
|---|---|---|---|
| 3,343,420 | 9/1967 | Kondo et al. ................... | 73/720 |
| 3,363,456 | 1/1968 | Laimins .......................... | 73/141 |
| 3,894,435 | 7/1975 | Shimada et al. ................ | 73/721 |
| 4,058,788 | 11/1977 | Andrews et al. ................ | 73/720 |
| 4,104,924 | 8/1978 | Caspar et al. .................. | 73/716 |
| 4,203,327 | 5/1980 | Singh .............................. | 73/721 |
| 4,212,209 | 7/1980 | Newbold et al. ............... | 73/721 |

Primary Examiner—Donald O. Woodiel
Attorney, Agent, or Firm—Craig and Antonelli

[57] ABSTRACT

A differential pressure transducer having a cantilever and a semiconductor strain gauge attached to each side of the cantilever at an intermediate portion of the latter. The cantilever has one end fixed by electron beam welding to a fixing member and the other end left for free displacement in response to a differential pressure. The displacement of the other end of the cantilever is detected as changes in the electric resistances of the semiconductor strain gauges.

12 Claims, 4 Drawing Figures ized. A cantilever 170 in the form of an elongated rod-like member is connected to the connecting shaft 150 through a leaf spring 160 such that the cantilever 170 is deflected through the leaf spring 160.

DIFFERENTIAL PRESSURE TRANSDUCER

BACKGROUND OF THE INVENTION

The present invention relates to an improvement in a differential pressure transducer of a semiconductor strain gauge of cantilever type and, more particularly, to an improvement in the construction for fixing the cantilever.

In the differential pressure transducer making use of a cantilever, a strain gauge is attached to one or each surface of the cantilever by bonding, evaporation, soldering or welding. The cantilever is fixed at its one end to a base or a main body of the transducer while the other is left for free displacement. In operation, the amount of displacement corresponding to the pressure differential is detected as a change in the electric resistance of the strain gauge.

The differential pressure transducers are usually directly attached to the process pipings in various plants such as chemical plants, steel-making plants, petroleum plants and the like. Since the pressure differential transducer is intended for use at the site, it must stand for use at a large variety of temperatures of between, for example, −40° C. and +120° C. Also, the differential pressure transducer is directly subjected to environmental vibration. Thus, the differential pressure transducer is used under extremely severe conditions.

Conventionally, the fixing of the cantilever at its one end has been made by means of screws. The fixed end, however, is liable to be loosened due to a repeated change in the ambient temperature, because the material of the cantilever and the fixing members have different coefficients of thermal expansion. This loosening inconveniently results in a non-linearity of the characteristic of the differential pressure transducer and increase of the hysteresis. Further, the performance of the transducer is gradually deteriorated due to such changes a making the transducer unusable. This type of differential pressure transducer is disclosed in the specification of U.S. Pat. No. 3,363,456.

In addition, this type of differential pressure transducer requires a space for driving the screws by which the end of the cantilever is fixed, which in turn makes it difficult to design and a small-sized and light-weight differential pressure transducer. In this type of differential pressure transducer, the joints between the cantilever and the fixing member, between the fixing member and the hermetic member and between the hermetic member and the main body of the transducer are made by welding. The welding between the hermetic member and the main body, however, is liable to result in separation or cracks due to the thermal distorsion of the hermetic member.

SUMMARY OF THE INVENTION

It is, therefore, an object of the invention to overcome the above-stated drawbacks of the prior art by providing a differential pressure transducer which is less likely to be influenced by the ambient temperature and vibration and which is less liable to show cracks in the welded parts.

To this end, according to the invention, there is provided a differential pressure transducer having a cantilever to the surface of an intermediate portion of which is fixed a semiconductor strain gauge, the cantilever being fixed at its one end to a fixing member, a hermetic member to which the fixing member is fixed and a main body to which the hermetic member is fixed, the other end of the cantilever being left for free displacement the amount of which being detected as a change in the electric resistance of the semiconductor strain gauge, wherein the end of the cantilever is fixed to the fixing member by welding. According to another aspect of the invention, there is provided a differential pressure transducer of the type stated above, wherein the fixing of the hermetic member to the main body is made by welding an annular projection of the hermetic member to the main body of the transducer.

DETAILED DESCRIPTION OF THE PREFERRED EMBODIMENTS

Figure 1:
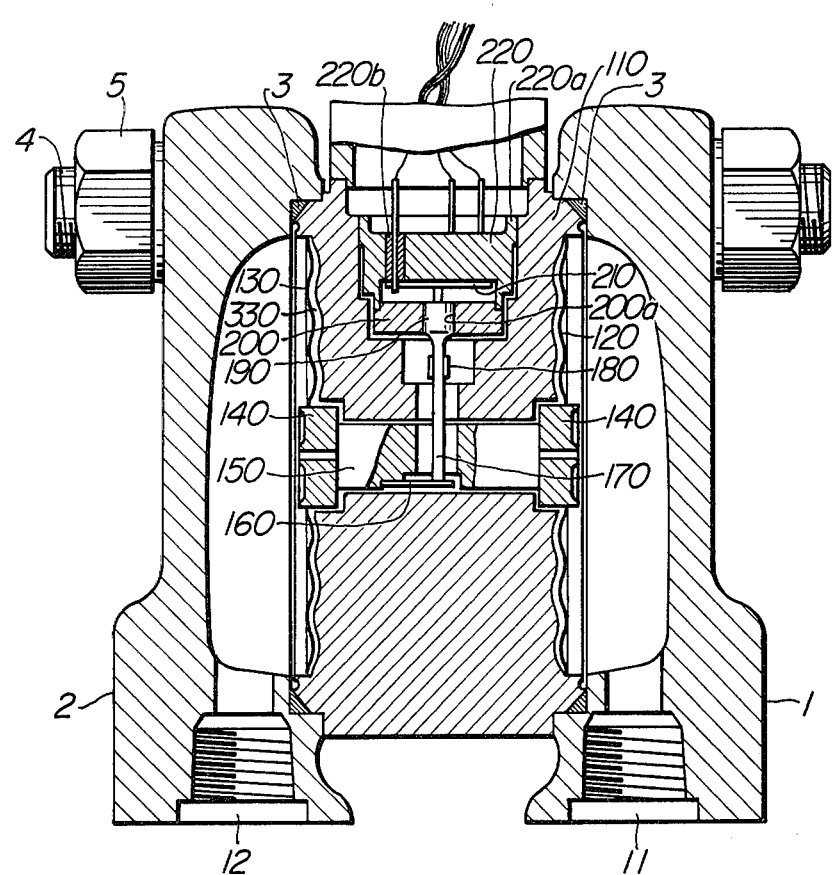
FIG. 1 is a sectional view of the main part of a differential pressure transducer in accordance with one embodiment of the invention.

Referring to FIG. 1, two pressures to be measured are introduced into a high-pressure flange 1 and a low-pressure flange 2, respectively, through a high-pressure inlet port 11 and a low-pressure outlet port 12. The high-pressure flange 1 and the low-pressure flange 2 are fixed to a main body member 110 through the medium of gaskets 3 by means of bolts and nuts 4, 5. A high-pressure diaphragm 120 and a low-pressure diaphragm 130 are attached to the main body member 110 at portions of the latter closer to the high-pressure flange 1 and the low-pressure flange 2, respectively. A center member 140 is attached to the center of each of the high-pressure diaphragm 120 and the low-pressure diaphragm 130, respectively. These center members 140 are connected to each other by means of a connecting shaft 150, so that the high-pressure diaphragm 120 and the low-pressure diaphragm 130 are adapted to be displaced simultaneously. A cantilever 170 in the form of an elongated rod-like member is connected to the connecting shaft 150 through a leaf spring 160 such that the cantilever 170 is deflected through the leaf spring 160.

A semiconductor strain gauge 180, which is a strain-electric resistance conversion element, is adhered to the cantilever 170. The cantilever 170 has a cylindrical cantilever fixing portion 190 which is adapted to be received by a bore 200a of the cantilever fixing member 200. In assembling, after inserting the cylindrical fixing portion 190 into the bore 200a, an electron beam welding is effected around the upper periphery of the fixing portion 190 to fix the cantilever 170 to the fixing member 200. More specifically, after inserting the fixing portion 190 of the cantilever 170 to the bore 200a of the cantilever fixing member 200, the upper periphery of the fixing portion 190 is welded in symmetry with respect to the axis of the cantilever 170 to the cantilever fixing member 200 so as to be fixed to the latter. The cantilever fixing member 200 in turn is welded to a hermetic seal member 220. An annular projection 220a is formed on the hermetic seal member 220. This annular projection 220a is welded to the main body member 110 by means of an electron beam thereby to fix the hermetic seal member 220 to the main body 110.

Thus, the cantilever 170 is attached to the main body member 110 through the medium of the cantilever fixing member 200 and the hermetic seal member 220.

The space between the high and low-pressure diaphragm 120, 130 and the main body member 110, the space between the combination of the diaphragm center members 140 and connecting shaft 150 and the main body member 110, and the space 330 between the assembly of the cantilever 170, semiconductor strain gauge 180, cantilever fixing member 200 and hermetic seal member 220 and the main body member 110 are charged with a liquid such as silicon oil.

The electric signal derived from the semiconductor strain gauge 180 is delivered to an amplifier (not shown) through a wire member 210 adapted for effecting a temperature compensation for the strain gauge 180 and then through the hermetic seal member which provides a seal against the external pressure.

The differential pressure transducer of the described embodiment operates in a manner explained hereinunder.

A high-pressure fluid and a low-pressure fluid are introduced through the high-pressure inlet port 11 of the high-pressure flange 1 and the low-pressure inlet port 12 of the low-pressure flange 2, respectively. The pressures of these fluids are applied, respectively, to the high-pressure diaphragm 120 and the low-pressure diaphragm 130. In consequence, the diaphragms are displaced by the differential between these pressures. The displacement of these pressures is then transmitted to the end of the cantilever 170, through the diaphragm center members 140, connecting shaft 150 and the leaf spring 160. The displacement at the end of the cantilever 170 then causes a strain in the strain gauge 180 to change the electric resistance of the latter.

As has been described, in the first embodiment of the invention, not only the fixing of the cantilever 170 to the cantilever fixing member 200, but also the fixing of the cantilever fixing member 200 to the hermetic seal member 220 and the fixing of the hermetic seal member 220 to the main body member 110 are made by welding. As a result, it is possible to effect a highly accurate differential pressure transducer. At the same time, the size of the cantilever 170 can be reduced to about ⅔ because the cantilever 170 needs not have a portion for fixing by screws. Further, since the space for driving the screws is eliminated, the differential pressure transducer as a whole is made small and light.

Further, by effecting the welding between the cantilever 170 and the cantilever fixing member 200 in symmetry with respect to the axis of the cantilever 170, the thermal distortions generated in the welded parts are negated by each other to avoid the influence of the thermal distortion on the displacement of the cantilever and to diminish the influence of the drift due to the temperature change, as well as hysteresis.

It is also to be noted that, since the fixing of the hermetic seal member 220 is welded at its annular projection 220a to the main body member 110, the thermal distortion does not affect the hermetic seal 220b, so that the separation of the hermetic seal member 220 from the hermetic seal 220b, as well as cracks, is fairly avoided.

Another embodiment of the invention will be described with reference to FIGS. 2 to 4. In these Figures, the same reference numerals are used to denote the same parts or members as those in FIG. 1.

Figure 2:
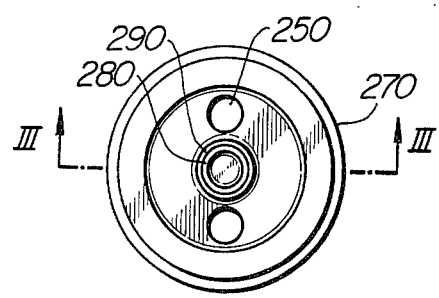
FIG. 2 is a plan view of a cantilever and a cantilever fixing member of the differential pressure transducer in accordance with another embodiment of the invention.
Figure 3:
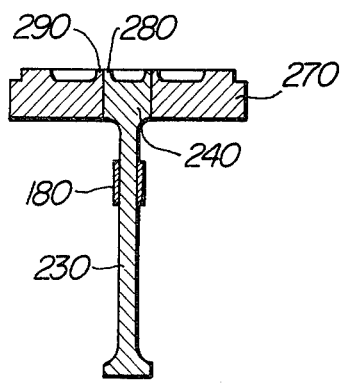
FIG. 3 is a sectional view taken along the line III—III of FIG. 2.
Figure 4:
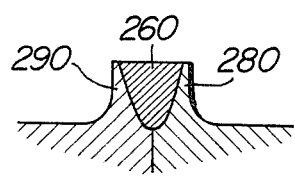
FIG. 4 is an enlarged sectional view of the welded part between the cantilever and cantilever fixing member of the differential pressure transducer in accordance with another embodiment of the invention.

Referring to FIGS. 2 to 4, a strain gauge 180 is attached to each side of a cantilever 230 made of a material having a thermal expansion coefficient approximating that of the strain gauge 180. The cantilever 230 has a cantilever fixing portion 240 on the periphery of which formed is a projection 280. The cantilever fixing member 270 has a projection 290 formed on the wall of the inner bore thereof. The wires leading from the strain gauge 180 are extended to the hermetic seal member 220, through wire lead-out port 250.

As will be clearly seen from FIG. 4, the projection 280 of the cantilever fixing portion 240 and the projection 290 of cantilever fixing member 270 are put in contact with each other and welded to each other by an electron beam thereby to form a welded portion 260.

It will be seen that the second embodiment has a construction materially identical to that of the first embodiment shown in FIG. 1, except the of the projection of the cantilever 230 and the projection of the cantilever fixing member 270, and, accordingly, operates substantially in the same manner as the first embodiment. The further description of construction and operation of the second embodiment, therefore, is omitted here.

In the described second embodiment, the welded portion 260 and its periphery effectively prevents the cracks attributable to the stress caused by the difference in the coefficients of thermal expansion between the cantilever 230 and the cantilever fixing member 270 due to a temperature drop after the welding, because such a stress is conveniently absorbed by the elastic and plastic deformation of the projections in the welded portion 260.

The provision of the projections also provides an advantage that the heat input due to welding is diminished and to reduce the diffusion of heat to the non-welded part, which in turn decreases the thermal expansion and shrinkage and, hence, the thermal stress.

Further, since the heat input during the welding is diminished, the cantilever 230 and the cantilever fixing member 270 exhibit smaller change of size due to heat, which in turn contributes to the improvement in the performance of the differential pressure transducer.

Although electron beam welding is adopted in the described embodiment, this is not exclusive and the welding can be accomplished by means of laser beam, as well as by other forms of welding.

What is claimed is:

1. A differential pressure transducer having a cantilever fixing member with a bore therethrough, a cantilever, said cantilever being an elongated rod-like member having first and second ends, and at least one strain gauge attached to a surface of said cantilever at an intermediate portion of the latter, said cantilever having its first end received in the bore of said cantilever fixing member and fixed thereat while the second end is left for free displacement such that said displacement is detected as a change in the electric resistance in said strain gauge, characterized in that said cantilever is fixed at said first end by means of welding to said cantilever fixing memberd at the upper periphery of said first end.

2. A differential pressure transducer as claimed in claim 1, wherein the welding between said cantilever and said cantilever fixing member is made substantially symmetrically with respect to the axis of said cantilever.

3. A differential pressure transducer as claimed in claim 1 or 2, wherein each of said cantilever and said cantilever fixing member is provided with a projection, the projections being contacted and welded to each other thereby to fix said cantilever to said cantilever fixing member.

4. A differential pressure transducer as claimed in claim 3, wherein said first end of said cantilever has a cylindrical fixing portion adapted to be received by said bore in said cantilever fixing member, the end surfaces of said cylindrical fixing portion being welded at the upper periphery thereof to said cantilever fixing member thereby to fix said cantilever to said cantilever fixing member.

5. A differential pressure transducer having a main body member connected between a high-pressure flange and a low-pressure flange each of which having a pressure inlet port, a high-pressure diaphragm and a low-pressure diaphragm attached to said high-pressure flange and said low-pressure flange, respectively, center means connected to said high-pressure and low-pressure diaphragms, a connecting shaft through which said center members are connected to each other, a spring associated with said connecting shaft, a cantilever in the form of an elongated rod-like member with first and second ends, at least one semiconductor strain gauge adhered to at least one surface of said cantilever at an intermediate portion of said cantilever, a cantilever fixing member to which said first end of said cantilever is fixed, and a hermetic member through which said cantilever fixing member is fixed to said main body member, said cantilever being connected at said second end to said spring, the space defined by said main body member, said high-pressure and low-pressure diaphragms, said center members, said connecting shaft, said cantilever, said fixing memer and said hermetic member being filled with a fluid, said high-pressure diaphragm and said low-pressure diaphragm being adapted to receive a high fluid pressure and a low fluid pressure introduced through said high and low pressure inlet ports such that said second end of said cantilever is displaced by the differential pressure, the displacement being detected as a change in the electric resistance of said strain gauge, characterized in that the fixing of said first end of said cantilever to said cantilever fixing member is made by welding, said welding being made substantially in symmetry with respect to the axis of said cantilever and that said hermetic member has an annular projection and is fixed at said annular projection by welding to said main body member.

6. A differential pressure transducer having a cantilever in the form of an elongated rod-like member with first and second ends, at least one semiconductor strain gauge adhered to at least one surface of said cantilever at an intermediate portion of said cantilever, a fixing member to which said cantilever is fixed at said first end, and a hermetic member through which said fixing member is fixed to a main body member of said transducer, said second end of said cantilever being left for free displacement in response to a differential pressure, said displacement being detected as a change in electric resistance said strain gauge, characterized in that said cantilever is fixed at said first end thereof to said fixing member by welding, and that said hermetic member has an annular projection and is fixed at said annular projection to said main body member by welding.

7. A differential pressure transducer comprising:
 a main body member having a high-pressure and a low-pressure introduced thereto in opposition;
 diaphragms disposed in said main body member and arranged to come into contact with the high-pressure and low-pressure;
 connecting means connected to both of said diaphragms so that both of said diaphragms move together;
 a fixing member connected to said main body member, said fixing member having a through bore therein;
 a cantilever in the form of an elongated rod-like member having first and second ends, said first end being received in the bore of said fixing member and being fixedly joined thereto by a welded connection at the periphery of the end surface thereof, and said second end being disposed between said diaphragms and connected to said connecting means for being displaced by movement of said diaphragms; and
 at least one strain gauge adhered to a side surface of said cantilever for providing an output in accordance with the displacement of said cantilever.

8. A differential pressure transducer according to claim 7, wherein an end edge of said first end of said cantilever received in the bore of said fixing member and an end edge of the bore of said fixing member are provided with a projection extending in the axial direction of the cantilever, respectively, said cantilever and said fixing member being fixedly joined together by welding at each said projection.

9. A differential pressure transducer according to claim 7 or claim 8, wherein said cantilever and said fixing member are fixedly joined by welding which is symmetric with respect to an axis of said cantilever.

10. A differential pressure transducer according to claim 9, wherein said projections are annular projections and said cantilever and said fixing member are fixedly joined by an annular welding at said projections.

11. A differential pressure transducer according to claim 9 wherein said welding is an electronic beam.

12. A differential pressure transducer according to claim 7, wherein said strain gauge is a semiconductor strain gauge.

* * * * *